US009333786B2

(12) United States Patent
Campbell

(10) Patent No.: US 9,333,786 B2
(45) Date of Patent: May 10, 2016

(54) LASER-SENSITIVE COATING FORMULATIONS

(75) Inventor: Jonathan Campbell, Riehen (CH)

(73) Assignee: Datalase, Ltd., Widnes (GB)

( * ) Notice: Subject to any disclaimer, the term of this patent is extended or adjusted under 35 U.S.C. 154(b) by 606 days.

(21) Appl. No.: 12/668,669

(22) PCT Filed: Jul. 4, 2008

(86) PCT No.: PCT/EP2008/058637

§ 371 (c)(1), (2), (4) Date: May 13, 2010

(87) PCT Pub. No.: WO2009/010405

PCT Pub. Date: Jan. 22, 2009

(65) Prior Publication Data

US 2010/0233447 A1 Sep. 16, 2010

(30) Foreign Application Priority Data

Jul. 18, 2007 (EP) .................................... 07112662
Aug. 22, 2007 (EP) .................................... 07114742
Sep. 7, 2007 (EP) .................................... 07115873

(51) Int. Cl.

*B32B 3/10* (2006.01)
*C08K 5/1545* (2006.01)
*B05D 5/06* (2006.01)
*B41M 5/26* (2006.01)
*B41M 5/30* (2006.01)
*B41M 5/323* (2006.01)
*B41M 5/333* (2006.01)
*B41M 5/337* (2006.01)

(52) U.S. Cl.

CPC . *B41M 5/26* (2013.01); *B41M 5/30* (2013.01); *B41M 5/323* (2013.01); *B41M 5/333* (2013.01); *B41M 5/337* (2013.01); *Y10T 428/24802* (2015.01)

(58) Field of Classification Search

CPC ...................................................... B41M 5/333
USPC ...................................................... 428/195.1
See application file for complete search history.

(56) References Cited

U.S. PATENT DOCUMENTS 2,357,725 A 9/1944 Bennett
2,427,443 A 9/1947 Cochran
2,800,457 A 7/1957 Green et al.
3,373,170 A 3/1968 Jones
3,513,114 A 5/1970 Hahn et al.
3,778,383 A * 12/1973 Schibler et al. .......... 428/402.21
3,853,791 A 12/1974 Feins
3,955,987 A 5/1976 Schaar et al.
3,959,571 A 5/1976 Yahagi et al.
4,035,559 A * 7/1977 Fujii et al. .................... 525/386
4,166,811 A * 9/1979 Marr et al. .................... 523/202
4,237,212 A 12/1980 Inoue et al.
4,241,144 A 12/1980 Hendy
4,325,863 A 4/1982 Hinsken et al.
4,338,244 A 7/1982 Hinsken et al.
4,619,956 A 10/1986 Susi
4,916,247 A 4/1990 Steinnmann et al.
5,035,983 A 7/1991 Kiyonari et al.
5,063,137 A 11/1991 Kiyonari et al.
5,166,350 A 11/1992 Bedekovic et al.
5,175,312 A 12/1992 Dubs et al.
5,198,498 A 3/1993 Valet et al.
5,216,052 A 6/1993 Nesvadba et al.
5,252,643 A 10/1993 Nesvadba
5,256,805 A 10/1993 O'Lenick et al.
5,298,067 A 3/1994 Valet et al.
5,322,868 A 6/1994 Valet et al.
5,358,821 A * 10/1994 Bertrand et al. ......... 430/137.11
5,369,140 A 11/1994 Valet et al.
5,413,629 A 5/1995 Yasui et al.
5,560,769 A 10/1996 Conner et al.
5,810,915 A 9/1998 Nagai et al.
5,897,938 A 4/1999 Shinmoto et al.
5,948,836 A 9/1999 Bonora
6,057,380 A 5/2000 Birbaum et al.
6,143,904 A 11/2000 Zink et al.
6,210,472 B1 4/2001 Kwan et al.
6,261,348 B1 7/2001 Kwan et al.
6,394,594 B1 5/2002 Katsuragi et al.
6,425,947 B1 7/2002 Berlin et al.
6,478,861 B1 11/2002 Kwan et al.
6,888,095 B2 5/2005 Khan (Continued)

FOREIGN PATENT DOCUMENTS

CA 2042858 11/1991
DE 2130845 1/1972

(Continued)

OTHER PUBLICATIONS

Specification sheet for Texieryl S-02 acquired from http://www.scottbader.com/downloads/UK_PDF_Datasheet_Files/Graphic_Arts/Texieryl%20S-02.pdf on Nov. 2, 2012.

(Continued)

*Primary Examiner* — Ian Rummel
(74) *Attorney, Agent, or Firm* — Stoel Rives, LLP; Zhi-Xiang (Alex) Oh

(57) ABSTRACT

The present invention provides polymeric particles comprising a polymeric matrix comprising one or more water-insoluble polymers and a laser-sensitive system encapsulated in the polymeric matrix. It also provides a process for the preparation of the polymeric particles, a composition comprising the polymeric particles, a process for the preparation of this composition, a process for forming a laser-sensitive coating layer on a substrate using this composition, a coated substrate obtainable by the coating process, a process for preparing a marked substrate and a marked substrate obtainable by the marking process.

10 Claims, No Drawings

(56) References Cited

U.S. PATENT DOCUMENTS

| | | | | |
|---|---|---|---|---|
| 7,144,676 | B2 | 12/2006 | Barr et al. | |
| 7,202,288 | B2 | 4/2007 | Kniess et al. | |
| 7,270,919 | B2 | 9/2007 | Stubbs | |
| 7,410,744 | B2 | 8/2008 | Watanbe et al. | |
| 7,485,403 | B2 | 2/2009 | Khan | |
| 7,635,662 | B2 | 12/2009 | Kabashima et al. | |
| 7,708,974 | B2 | 5/2010 | Yadav | |
| 7,998,653 | B2 | 8/2011 | O'Donoghue et al. | |
| 8,083,847 | B2 | 12/2011 | Takeda et al. | |
| 8,101,545 | B2 | 1/2012 | Campbell et al. | |
| 8,461,075 | B2 | 6/2013 | Watanabe et al. | |
| 8,642,504 | B2 | 2/2014 | Campbell et al. | |
| 8,853,314 | B2 | 10/2014 | Mamak | |
| 2001/0044553 | A1 | 11/2001 | Kabashima et al. | |
| 2003/0180660 | A1* | 9/2003 | Khan | 430/270.1 |
| 2003/0191223 | A1* | 10/2003 | Waterkamp et al. | 524/431 |
| 2003/1018600 | | 10/2003 | Khan | |
| 2004/0063817 | A1* | 4/2004 | Ilenda et al. | 523/220 |
| 2004/0110870 | A1 | 6/2004 | Liu | |
| 2004/0157975 | A1 | 8/2004 | Kniess et al. | |
| 2005/0148467 | A1 | 7/2005 | Makitalo et al. | |
| 2005/0158548 | A1 | 7/2005 | Senga | |
| 2006/0040217 | A1 | 2/2006 | Stubbs | |
| 2006/0155007 | A1* | 7/2006 | Huber | 523/205 |
| 2006/0178254 | A1 | 8/2006 | Takeda et al. | |
| 2006/0223974 | A1 | 10/2006 | Winterling et al. | |
| 2007/0054220 | A1 | 3/2007 | Heneghan | |
| 2007/0128542 | A1 | 6/2007 | Watanabe et al. | |
| 2007/0187653 | A1 | 8/2007 | Takeda et al. | |
| 2008/0113861 | A1 | 5/2008 | Watanabe et al. | |
| 2008/0308775 | A1 | 12/2008 | Yabuki | |
| 2009/0071367 | A1 | 3/2009 | Campbell et al. | |
| 2009/0214835 | A1 | 8/2009 | Campbell et al. | |
| 2009/0220749 | A1 | 9/2009 | O'Donoghue et al. | |
| 2010/0021833 | A1 | 1/2010 | Lehmann et al. | |
| 2010/0239642 | A1 | 9/2010 | Campbell et al. | |
| 2011/0148092 | A1 | 6/2011 | Jarvis et al. | |
| 2011/0274893 | A1 | 11/2011 | Kaser et al. | |
| 2012/0129090 | A1 | 5/2012 | Mamak | |

FOREIGN PATENT DOCUMENTS

| | | | |
|---|---|---|---|
| DE | 2914427 | | 10/1980 |
| DE | 4316611 | | 11/1993 |
| DE | 4316622 | | 11/1993 |
| DE | 4316876 | | 11/1993 |
| DE | 4338361 | | 5/1995 |
| EP | 0187329 | | 7/1986 |
| EP | 434608 | | 6/1991 |
| EP | 458502 | | 11/1991 |
| EP | 0546577 | | 6/1993 |
| EP | 0589839 | | 3/1994 |
| EP | 0591102 | | 4/1994 |
| EP | 600441 | | 6/1994 |
| EP | 0690094 | | 1/1996 |
| EP | 704437 | | 4/1996 |
| EP | 0 796 742 | A2 | 9/1997 |
| EP | 0812888 | | 12/1997 |
| EP | 0 980 028 | A1 | 2/2000 |
| EP | 1291384 | | 3/2003 |
| EP | 1676890 | | 7/2006 |
| EP | 1847635 | | 10/2007 |
| EP | 1859674 | | 11/2007 |
| GB | 989 264 | | 4/1965 |
| GB | 1347467 | | 2/1974 |
| GB | 1 355 124 | | 6/1974 |
| GB | 1389716 | | 4/1975 |
| GB | 2002801 | | 2/1979 |
| GB | 1548059 | | 7/1979 |
| GB | 2154597 | | 9/1985 |
| GB | 2 206 419 | A | 1/1989 |
| GB | 2297091 | | 7/1996 |
| JP | 02-166712 | | 6/1990 |
| JP | 03-76873 | | 4/1991 |
| JP | 08-073223 | | 3/1996 |
| JP | 11-67604 | | 3/1999 |
| JP | 2006-111675 | | 4/2006 |
| JP | 2006-132042 | | 5/2006 |
| JP | 2006-154516 | | 6/2006 |
| WO | WO-94/18278 | | 8/1994 |
| WO | WO-96/23659 | | 8/1996 |
| WO | WO-96/28431 | | 9/1996 |
| WO | WO-98/56852 | | 12/1998 |
| WO | WO-98/56853 | | 12/1998 |
| WO | WO-00/61377 | | 10/2000 |
| WO | WO-02/068205 | | 9/2002 |
| WO | WO-02/068207 | | 9/2002 |
| WO | WO-02/074548 | | 9/2002 |
| WO | WO-02/100914 | | 12/2002 |
| WO | WO-2004/043704 | | 5/2004 |
| WO | WO-2005/012442 | | 2/2005 |
| WO | WO-2005/037932 | | 4/2005 |
| WO | WO-2005/068207 | | 7/2005 |
| WO | WO-2006/051309 | | 5/2006 |
| WO | 2006/063165 | A2 | 6/2006 |
| WO | 2006/064193 | A1 | 6/2006 |
| WO | WO-2006-067073 | | 6/2006 |
| WO | WO-2006/068205 | | 6/2006 |
| WO | WO-2006/108745 | | 10/2006 |
| WO | WO-2006/129078 | | 12/2006 |
| WO | WO-2007/012578 | | 2/2007 |
| WO | WO-2007/031454 | | 3/2007 |
| WO | WO-2007/088104 | | 8/2007 |
| WO | WO-2007/092030 | | 8/2007 |
| WO | WO-2007/141522 | | 12/2007 |
| WO | WO-2008/083912 | | 7/2008 |
| WO | WO-2009/010393 | | 1/2009 |
| WO | WO-2009/010405 | | 1/2009 |
| WO | WO-2009-059901 | | 5/2009 |
| WO | WO-2010/046285 | | 4/2010 |
| WO | WO-2010-049282 | | 5/2010 |

OTHER PUBLICATIONS

"Dilute Ammonium Hydroxide" acquired from http://www51.honeywell.com/sm/em/common/documents/2.6_usa_msds_81.pdf on Nov. 28, 2011.

"Texieryl 13-567" acquired from http://www.scottbader.com/downloads/UK_PDF_Datasheet_Files/Graphic_Arts/13-567.pdf on Nov. 28, 2011.

Derwent AN 1999-238901[20] of JP 11-67604.

Derwent AN 1990-241627[32] of JP 03-76873.

Preliminary Amendment filed Sep. 11, 2007 in related U.S. Appl. No. 11/886,137.

First Office Action issued May 9, 2011 in related U.S. Appl. No. 11/886,137.

Response to the May 9, 2011 Office Action issued Aug. 3, 2011 in related U.S. Appl. No. 11/886,137.

Notice of Allowance issued Sep. 30, 2011 in related U.S. Appl. No. 11/886,137.

International Search Report and Written Opinion issued May 29, 2006 in International Application No. PCT/EP2006/060658.

International Preliminary Report on Patentability issued Sep. 25, 2007 in International Application No. PCT/EP2006/060658.

International Search Report and Written Opinion issued Oct. 30, 2006 in International Application No. PCT/EP2006/064299.

International Preliminary Report on Patentability issued Nov. 27, 2008 in International Application No. PCT/EP2006/064299.

Preliminary Amendment filed Jan. 12, 2001 related U.S Appl. No. 12/668,666.

First Office Action issued Dec. 11, 2012 in related U.S. Appl. No. 12/668,666.

Response to the Dec. 11, 2012 Office Action filed Jun. 11, 2013 in related U.S. Appl. No. 12/668,666.

Final Office Action issued Aug. 22, 2013 in related U.S. Appl. No. 12/668,666.

International Search Report and Written Opinion issued Sep. 11, 2008 in International Application No. PCT/EP2008/058547.

International Preliminary Report on Patentability issued Jan. 19, 2010 in International Application No. PCT/EP2008/058547.

(56) References Cited

OTHER PUBLICATIONS

International Search Report and Written Opinion issued Oct. 28, 2008 in International Application No. PCT/EP2008/058637.
International Preliminary Report on Patentability issued Jan. 19, 2010 in International Application No. PCT/EP2008/058637.
Preliminary Amendment filed Apr. 11, 2011 in related U.S. Appl. No. 13/123,603.
International Search Report and Written Opinion issued Jan. 25, 2010 in International Application No. PCT/EP2009/063521.
International Preliminary Report on Patentability issued May 3, 2011 in International Application No. PCT/EP2009/063521.
Preliminary Amendment filed Apr. 5, 2011 in related U.S. Appl. No. 13/122,563.
International Search Report and Written Opinion issued May 11, 2010 in International Application No. PCT/EP2009/063377.
International Preliminary Report on Patentability issued Apr. 26, 2011 in International Application No. PCT/EP2009/063377.
Preliminary Amendment filed Mar. 10, 2008 in related U.S. Appl. No. 11/991,762.
First Office Action issued Sep. 30, 2010 in related U.S. Appl. No. 11/991,762.
Response to the Sep. 30, 2010 Office Action filed Jan. 26, 2011 in realted U.S. Appl. No. 11/991,762.
Notice of Allowance issued Apr. 5, 2011 in related U.S. Appl. No. 11/991,762.
Preliminary Amendment filed Jan. 22, 2008 in related U.S. Appl. No. 11/989,167.
First Office Action issued Dec. 1, 2011 in related U.S. Appl. No. 11/989,167.
Response to the Dec. 1, 2011 Office Action filed Mar. 16, 2012 in related U.S. Appl. No. 11/989,167.
Second Office Action issued Apr. 30, 2012 in realted U.S. Appl. No. 11/989,167.
Response to the Apr. 30, 2012 Office Action filed Sep. 27, 2012 in related U.S. Appl. No. 11/989,167.
Final Office Action issued Nov. 8, 2012 in related U.S. Appl. No. 11/989,167.
Response to the Nov. 8, 2012 Office Action filed Apr. 8, 2013 in related U.S. Appl. No. 11/989,167.
Notice of Allowance issued Apr. 19, 2013 in related U.S Appl. No. 11/989,167.
Notice to File Corrected Application Papers issued Nov. 7, 2013 in U.S. Appl. No. 11/989,167.
Amendment and Response to Notice to File Corrected Application Papers filed Dec. 6, 2013 in U.S. Appl. No. 11/989,167.
Office Action issued Jan. 9, 2014 in U.S. Appl. No. 11/989,167.
Petition to Correct Assignee Information and for Corrected Patent filed Mar. 25, 2014 in U.S. Appl. No. 11/989,167.
Decision on the Petition issued Apr. 1, 2014 in U.S. Appl. No. 11/989,167.
Renewed Petition filed Apr. 17, 2014 in U.S. Appl. No. 11/989,167.
Response to the Aug. 22, 2013 Office Action filed Nov. 22, 2013 in U.S. Appl. No. 12/668,666.
Office Action issued Dec. 16, 2013 in U.S. Appl. No. 12/668,666.
Office Action issued Jun. 4, 2014 in U.S. Appl. No. 13/123,603.
Office Action issued Dec. 9, 2013 in U.S. Appl. No. 13/122,563.
Response to Dec. 9, 2013 Office Action filed May 8, 2014 in U.S. Appl. No. 13/122,563.
Notice of Allowance issued Jun. 2, 2014 in U.S. Appl. No. 13/122,563.
Notice of Allowance issued Aug. 2, 2013 in U.S. Appl. No. 11/989,167.
Decision on the Petition issued Jun. 6, 2014 in U.S. Appl. No. 11/989,167.
Response to Jun. 4, 2014 Office Action filed Dec. 2, 2014 in U.S. Appl. No. 13/123,603.
Office Action issued Jan. 12, 2015 in U.S. Appl. No. 13/123,603.
U.S. Appl. No. 13/123,603, Nov. 20, 2015, Notice of Allowance.
Response to Jan. 12, 2015 Office Action Filed Jul. 13, 2015 in U.S. Appl. No. 13/123,603.
Office Action Issued Aug. 26, 2015 in U.S. Appl. No. 13/123,603.
Response to Aug. 26, 2015 Office Action Filed Nov. 4, 2015 in U.S. Appl. No. 13/123,603.

* cited by examiner

LASER-SENSITIVE COATING FORMULATIONS

The present invention refers to polymeric particles comprising a laser-sensitive system, to a process for the preparation of the polymeric particles, to a composition comprising the polymeric particles, to a process for the preparation of this composition, to a process for forming a laser-sensitive coating layer on a substrate using this composition, to a coated substrate obtainable by above process, to a process for preparing a marked substrate and to a marked substrate obtainable by above process.

Substrates produced on production lines, for example paper, paperboard or plastics, are usually marked with information such as logos, bar codes or batch numbers. Traditionally, the marking of these substrates has been achieved by various printing techniques for example ink-jet or thermal transfer printing. However, these printing techniques are more and more replaced by laser marking as laser marking is cheaper in terms of overall economics and shows performance benefits such as high speed and contact free marking, marking of substrates with uneven surfaces and creation of marks that are so small that they are invisible or nearly invisible to the human eye. Also consumable substrates such as tablets or pills have recently been marked using laser irradiation.

The substrates to be marked by laser irradiation are either laser-sensitive themselves or are coated with a laser-sensitive composition.

The laser-sensitive composition comprises a laser-sensitive system and, usually, it also comprises a suitable binder. An optimum binder should have the optimum properties of a coating composition such as high speed of drying and high adhesion to the substrate as well as the optimum properties with regard to the laser-sensitive system such as compatibility with the laser-sensitive system and the capability of increasing the sensitivity of the laser-sensitive system, for example by showing a good absorption for the selected laser-wavelength.

However, a binder having optimum properties for a coating composition may not always be a binder having optimum properties with regard to the laser-sensitive system.

Thus, there is a need for a laser-sensitive coating composition which shows optimum coating properties as well as optimum laser-marking performance.

WO 2006/063165 describes a laser-sensitive coating composition comprising a dye precursor, which is an electron donor, and a developer, which is an electron acceptor, wherein the dye precursor and the developer are encapsulated separately.

The disadvantage of the laser-sensitive coating composition of WO 2006/063165 is that it is necessary to encapsulate the dye precursor and the developer separately in order to prevent premature colouration of the laser-sensitive system. Thus the preparation of the laser-sensitive coating composition of WO 2006/063165 is not convenient as it involves the preparation of the encapsulated dye precursor, the preparation of the encapsulated developer and the subsequent mixing of the two encapsulated systems.

Thus, it was an object of the present invention to provide a laser-sensitive coating composition which shows optimum coating properties as well as optimum laser-marking performance, and which can be prepared by an easy and convenient process.

This object is solved by the polymeric particles of claim 1, the processes of claims 6, 18, 19 and 21, the composition of claim 17 and the substrates of claims 20 and 23.

The polymeric particles of the present invention comprise a polymeric matrix comprising one or more water-insoluble polymers and a laser-sensitive system encapsulated in the polymeric matrix. Preferred are polymeric particles wherein at least one of the one or more water-insoluble polymers is crosslinked.

The phrase "a laser-sensitive system encapsulated in the polymeric matrix" means that the complete laser-sensitive system, and not just parts of the laser-sensitive system, are encapsulated in the polymeric matrix.

A polymer is water-insoluble if less than 5 g polymer dissolve in 100 g neutral (pH=7) water.

The polymeric particles can have a particle size in the range of 0.001 to 1000 μm (1 nm to 1 mm). Preferably, the particle size is in the range of 0.01 to 500 μm, more preferably, it is in the range of 0.1 to 100 μm, most preferably it is in the range of 1 to 20 μm.

The water-insoluble polymers can be selected from the group consisting of acrylic polymers, styrene polymers, hydrogenated products of styrene polymers, vinyl polymers, vinyl polymer derivatives, polyolefins, hydrogenated polyolefins, epoxidized polyolefins, aldehyde polymers, aldehyde polymer derivatives, ketone polymers, epoxide polymers, polyamides, polyesters, polyurethanes, polyisocyanates, sulfone-based polymers, silicium-based polymers, natural polymers and natural polymer derivatives.

The invention relates especially to polymeric particles wherein the one or more water-insoluble polymers are selected from the group consisting of acrylic polymers, styrene polymers, hydrogenated products of styrene polymers, vinyl polymers, vinyl polymer derivatives, polyolefins, hydrogenated polyolefins, epoxidized polyolefins, aldehyde polymers, epoxide polymers, polyamides, polyesters, polyurethanes, sulfone-based polymers, polysilicates, polysiloxanes, natural polymers and natural polymer derivatives.

The invention relates more especially to polymeric particles wherein at least one of the one or more water-insoluble polymers is crosslinked.

If the polymeric matrix comprises two polymers, the polymers can form a core shell polymer, wherein one polymer is the shell and the other the core.

The polymeric particles of the present invention are not intended for use in flameproofing and fire retarding and, do, hence, not include typical flameproofing substances, like asbestos and glass fibre, i.e. they are different from a typical flameproofing and fire-retarding composition.

The same is true with respect to the used binders. While the binders in flameproofing and fire-retarding compositions are preferably water-insoluble and incombustible, e.g. halogenated, like especially chlorinated hydrocarbons, like halogenated naphthalene (e.g. Halowax [trade name]), polychlor diphenyl (e.g. Arochlor [trade name]), chlorinated rubber or neoprene (trade name) as mentioned e.g. in U.S. Pat. No. 2,357,725, the binders used in connection with the present invention may be combustible. Combustibility of the binders may sometimes even be desired.

Acrylic polymers can be polymers formed from a monomer mixture comprising at least one acrylic monomer and optionally other ethylenically unsaturated monomer such as a styrene monomer, vinyl monomer, olefin monomer or α,β-unsaturated carboxylic acid monomer by polymerization of the respective monomers.

Examples of acrylic monomers are (meth)acrylic acid, (meth)acrylamide, (meth)acrylonitrile, ethyl(meth)acrylate, butyl(meth)acrylate, hexyl(meth)acrylate, 2-ethylhexyl (meth)acrylate, glycidyl methacrylate, acetoacetoxyethyl methacrylate, dimethylaminoethyl acrylate and diethylaminoethyl acrylate. Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of α,β-unsaturated carboxylic acid monomers are maleic acid, itaconic acid, crotonic acid, maleic anhydride and maleimide.

Examples of acrylic polymers are poly(methyl methacrylate) and poly(butyl methacrylate), polyacrylic acid, styrene/2-ethylhexyl acrylate copolymer, styrene/acrylic acid copolymer.

Styrene polymers can be polymers formed from a monomer mixture comprising at least one styrene monomer and optionally at least one vinyl monomer, olefin monomer and/or α,β-unsaturated carboxylic acid monomer by polymerization of the respective monomers. Examples of styrene polymers are polystyrene (PS), styrene butadiene styrene block polymers, styrene ethylene butadiene block polymers, styrene ethylene propylene styrene block polymers and styrene-maleic anhydride copolymers. So-called "hydrocarbon resins" are usually also styrene polymers.

Vinyl polymers can be polymers formed from a monomer mixture comprising at least one vinyl monomer and optionally at least one olefin monomer and/or α,β-unsaturated carboxylic acid monomer by polymerization of the respective monomers. Examples of vinyl polymers are polyvinyl chloride (PVC), polyvinyl pyrrolidone, polyvinylidenfluoride, polyvinylalcohol, polyvinylacetate, partially hydrolysed polyvinyl acetate and methyl vinyl ether-maleic anhydride copolymers. Examples of vinyl polymer derivatives are carboxy-modified polyvinyl alcohol, acetoacetyl-modified polyvinyl alcohol, diacetone-modified polyvinyl alcohol and silicon-modified polyvinyl alcohol.

Polyolefins can be polymers formed from a monomer mixture comprising at least one olefin monomer and optionally at least one α,β-unsaturated carboxylic acid monomer by polymerization of the respective monomers. Examples of polyolefines are low-density polyethylene (LDPE), high-density polyethylene (HDPE), polypropylene (PP), biaxially orientated polypropylene (BOPP), polybutadiene, perfluoroethylene (Teflon) and isopropylene-maleic anhydride copolymer Aldehyde polymers can be polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of a polyalcohol is polyvinyl alcohol. Examples of amine monomers are aniline and melamine. Examples of urea monomers are urea, thiurea and dicyandiamide. Examples of aldehyde polymers are polyvinyl butyral formed from butyral and polyvinyl alcohol, melamine-formaldehyde polymer and urea-formaldehyde polymer. Aldehyde polymers formed from phenol and an aldehyde are called "phenol resins". Examples of aldehyde polymer derivatives are alkylated aldehyde polymers.

An example of a ketone polymer is ketone resin, a condensation product of methyl cyclohexanone and/or cyclohexanone.

Epoxide polymers can be polymers formed from at least one epoxide monomer and at least one alcohol monomer and/or amine monomer. Examples of epoxide monomers are epichlorohydrine and glycidol. Examples of alcohol monomers are phenol, cresol, resorcinol, xylenol, bisphenol A and glycol. An example of epoxide polymer is phenoxy resin, which is formed from epichlorihydrin and bisphenol A.

Polyamides can be polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalenedicarboxylic acid. Examples of polyamides are polyhexamethylene adipamide and polycaprolactam.

Polyesters can be formed from at least one monomer having a hydroxy as well as a carboxy group, anhydride group or lactone group or from at least one monomer having two hydroxy groups and at least one monomer having two carboxy groups, anhydride groups or a lactone group. An example of a monomer having a hydroxy as well as a carboxy group is adipic acid. An example of a diol is ethylene glycol. An example of a monomer having a lactone group is caprolactone. Examples of dicarboxylic acids are terephthalic acid, isophthalic acid and 1,4-naphthalenedicarboxylic acid. An example of a polyester is polyethylene terephthalate (PET). Polyesters formed from an alcohol and an acid or acid anhydride are called "alkyd resins".

Polyurethane can be polymers formed from at least one diisocyanate monomer and at least one polyol monomer and/or polyamine monomer. Examples of diisocyanate monomers are hexamethylene diisocyanate, toluene diisocyanate, isophorone diisocyanate and diphenylmethane diisocyanate.

Examples of sulfone-based polymers are polyarylsulfone, polyethersulfone, polyphenyl-sulfone and polysulfone. An example of a polysulfone is a polymer formed from 4,4-dichloro-diphenyl sulfone and bisphenol A.

Examples of silicum-based polymers are polysilicates, silicone resins and polysiloxanes.

Examples of natural polymers are starch, cellulose, gelatine, casein, rosin, terpene resin, shellac, copal Manila, asphalts, gum Arabic and natural rubber. Examples of natural polymer derivatives are dextrin, oxidised starch, starch-vinyl acetate graft copolymers, hydroxyethyl cellulose, hydroxypropyl cellulose, nirocellulose, methyl cellulose, ethyl cellulose, carboxymethyl cellulose, acetyl cellulose, acetyl propionyl cellulose, acetyl butyryl cellulose, propionyl cellulose, butyryl cellulose and chlorinated rubber.

The polymers listed above can be uncrosslinked or crosslinked.

It is preferred, that the polymer matrix comprises at least one crosslinked polymer.

Preferably, the polymeric matrix comprises one or more polymers selected from the group consisting of acrylic polymers, styrene polymers such as polystyrene, vinyl polymers such as polyvinyl pyrrolidone and polyvinyl alcohol, aldehyde polymers such as urea-formaldehyde resin and melamine formaldehyde resin, epoxide polymers, polyamides, polyurethanes, silicum-base polymers such as polysilicates, silicone resins and polysiloxanes, natural polymers such as gelatine and natural polymer derivatives such as cellulose derivatives, for example ethyl cellulose.

More preferably, the polymeric matrix comprises one or more polymers selected from the group consisting of acrylic polymers and aldehyde polymers.

More preferably, the polymeric matrix comprises i) styrene/acrylic acid copolymer and styrene/methyl methacrylate, ii) crosslinked polyacrylamide or iii) melamine-formaldehyde polymer and sodium acrylate/acrylamide copolymer, and iv) crosslinked styrene/acrylic acid copolymer and styrene/methyl methacrylate copolymer.

The laser-sensitive system can be any system capable of creating a mark upon laser irradiation. Preferably the laser-sensitive system is an IR laser-sensitive system capable of creating a mark upon IR laser irradiation.

Preferably, the laser-sensitive system is selected from the group consisting of i) a salt of an acid and an amine or mixtures of salts of acids and amines ii) titanium dioxide iii) an oxygen containing transition metal salt, iv) a compound containing a free carbonyl group and a nucleophile or a compound containing a free carbonyl group, which compound is substituted with one or more nucleophilic groups, v) a compound having functional groups and a metal compound or an acid, and vi) a colour former and a colour developer or a latent colour developer which generates a colour developer upon activation, preferably a colour former and a latent colour developer.

Re i) Laser-sensitive systems comprising a salt of an acid and an amine or mixtures of salts of an acid and an amine are described in WO 07/031,454.

The acid can be selected from the group consisting of inorganic acids, sulfur-based organic acids, phosphor-based organic acids and carboxylic acids.

Examples of inorganic acids are sulfuric acid, fluorosulfuric acid, chlorosulfuric acid, nitrosylsulfuric acid, thiosulfuric acid, sulfamic acid, sulfurous acid, formamidinesulfinic acid, nitric acid, phosphoric acid, thiophosphoric acid, fluorophosphoric acid, hexafluorophosphoric acid, polyphosphoric acid, phosphorous acid, hydrochloric acid, chloric acid, perchloric acid, hydrobromic acid, hydriodic acid, hydrofluoric acid and boric acid.

Examples of sulfur-based organic acids such as 4-styrenesulfonic acid, p-toluenesulfonic acid, benzene sulfonic acid, xylene sulfonic acid, phenol sulfonic acid, methane sulfonic acid, trifluoromethane sulfonic acid, poly(4-styrene sulfonic acid) and copolymers comprising 4-styrene sulfonic acid units such as poly(4-styrenesulfonic acid-co-maleic acid).

Examples of phosphor-based organic acids are phenyl phosphonic acid, methane phosphonic acid, phenyl phosphinic acid, 2-aminoethyl dihydrogenphosphate, phytic acid, 2-phospho-L-ascorbic acid, glycero dihydrogenphosphate, diethylenetriamine penta(methylenephosphonic acid) (DTPMP), hexamethylenediamine tetra(methylene-phosphonic acid) (HDTMP), nitrilotris(methylene phosphonic acid) and 1-hydroxyethylidene diphosphonic acid.

Examples of carboxylic acids are tartaric acid, dichloroacetic acid, trichloroacetic acid, oxalic acid and maleic acid.

Preferably, the acid is an inorganic acid. More preferably, it is selected from the group consisting of sulfuric acid, thiosulfuric acid, sulfurous acid, phosphoric acid, polyphosphoric acid, phosphorous acid and boric acid. Most preferably, the acid is sulphuric acid or phosphoric acid.

The amine can be of formula $NR^1R^2R^3$, wherein $R^1$, $R^2$ and $R^3$ can be the same or different and are hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl, or $R^1$ is hydrogen, $C_{1-30}$-alkyl, $C_{2-30}$-alkenyl, $C_{4-8}$-cycloalkyl, $C_{5-8}$-cycloalkenyl, aralkyl, aralkenyl or aryl and $R^2$ and $R^3$, together with the nitrogen of the amine of formula $NR^1R^2R^3$ form a 5- to 7-membered ring, whereby $C_{1-30}$-alkyl, $C_{2-30}$-alkenyl, $C_{4-8}$-cycloalkyl, $C_{5-8}$-cycloalkenyl, aralkyl and aralkenyl can be unsubstituted or substituted with $NR^4R^5R^6$, imino, cyano, cyanamino, hydroxy and/or $C_{1-6}$-alkoxy, and aryl can be unsubstituted or substituted with $NR^4R^5R^6$, cyano, cyanamino, hydroxyl, $C_{1-6}$-alkyl, and/or $C_{1-4}$-alkoxy, wherein $R^4$, $R^5$ and $R^6$ can be the same or different and are hydrogen, $C_{1-6}$-alkyl, $C_{4-8}$-cycloalkyl or aryl.

Examples of $C_{1-30}$-alkyl are methyl, ethyl, propyl, isopropyl, butyl, sec-butyl, isobutyl, tert-butyl, pentyl, hexyl, heptyl, octyl, nonyl, decyl, undecyl, dodecyl, myristyl, palmityl, stearyl and arachinyl. Examples of $C_{2-30}$-alkenyl are vinyl, allyl, linolenyl, docosahexaenoyl, eicosapentaenoyl, linoleyl, arachidonyl and oleyl. Examples of $C_{4-8}$-cyclalkyl are cyclopentyl and cyclohexyl. An example of $C_{5-8}$-cycloalkenyl is cyclohexenyl. Examples of aralkyl are benzyl and 2-phenylethyl. Examples of aryl are phenyl, 1,3,5-triazinyl or naphthyl. Examples of $C_{1-6}$-alkyl are methyl, ethyl, propyl, isopropyl, butyl, sec-butyl, isobutyl, tert-butyl, pentyl, and hexyl. Examples of $C_{1-4}$-alkoxy are methoxy, ethoxy, propoxy, isopropoxy and butoxy.

Preferred $C_{1-30}$-alkyls are $C_{1-10}$-alkyl, more preferred $C_{1-30}$-alkyls are $C_{1-6}$-alkyl. Preferred $C_{2-30}$-alkenyls are $C_{2-10}$-alkyenyl, more preferred $C_{2-6}$-alkenyl. Examples of $C_{1-6}$-alkyl are given above. Examples of $C_{1-10}$-alkyl are methyl, ethyl, propyl, isopropyl, butyl, sec-butyl, isobutyl, tert-butyl, pentyl, hexyl, heptyl, octyl, nonyl and decyl. Examples of $C_{2-10}$-alkenyl and $C_{2-6}$-alkenyl are vinyl and allyl.

Examples of amines of formula $NR^1R^2R^3$ are ammonia, tris(hydroxymethyl)aminomethane, guanidine, methylamine, ethylamine, propylamine, butylamine, diethylamine, ethylene diamine, 1,2-diaminopropane, ethanolamine, triethanolamine, cyclohexylamine, aniline, melamine, methylolmelamine, pyrrole, morpholine, pyrrolidine and piperidine.

Preferably, the amine is of formula $NR^1R^2R^3$, wherein $R^1$ is hydrogen and $R^2$ and $R^3$ are as defined above.

More preferably, the amine is of formula $NR^1R^2R^3$, wherein $R^1$ and $R^2$ are hydrogen and $R^3$ is as defined above.

Most preferably, the amine is ammonia.

Preferably, the laser-sensitive system comprises ammonium sulphate, ammonium phosphate, ammonium hydrogenphosphate or ammonium dihydrogenphosphate or mixtures of ammonium sulphate and ammonium phosphate, ammonium hydrogenphosphate or ammonium dihydrogenphosphate.

The laser-sensitive system comprising a salt of an acid and an amine can also comprise a char forming compound. Examples of char forming compounds are carbohydrates such as monosaccharides, disaccharides and polysaccharides, and derivatives thereof wherein the carbonyl group has been reduced to a hydroxyl group, so-called sugar alcohols.

Examples of monosaccharides are glucose, mannose, galactose, arabinose, fructose, ribose, erythrose and xylose. Examples of disaccharides are maltose, cellobiose, lactose and sucrose (saccharose). Examples of polysaccharides are cellulose, starch, gum arabic, dextrin and cyclodextrin. Examples of sugar alcohols are meso-erythritol, sorbitol, mannitol and pentaerythritol.

Preferred char forming compounds are monosaccharides and disaccharides. More preferred char forming compounds are sucrose and galactose. The most preferred char forming compound is sucrose.

The laser-sensitive system comprising a salt of an acid and an amine or mixtures of salts of an acid and an amine, can comprise from 1 to 95% by weight of a salt of an acid and an amine or of mixtures of salts of an acid and an amine and from 5 to 99% by weight of a char-forming compound, based on the weight of the laser-sensitive system. Preferably, it comprises from 20 to 60% by weight of a salt of an acid and an amine or of mixtures of salts of an acid and an amine and from 40 to 80% by weight of a char-forming compound. More preferably, it comprises from 30 to 50% by weight of a salt of an acid and an amine or of mixtures of salts of an acid and an amine and from 50 to 70% by weight of a char-forming compound.

Re ii) Titanium dioxide can be in the rutile, brookite or antasase form. Preferably, Titanium dioxide is in the anatase form (also called octahedrite), a tetragonal mineral of dipyramidal habit. The titanium dioxide in the anatase form can have a particle size in the range of 0.001 to 1000 μm (1 nm to 1 mm). Preferably, the particle size is in the range of 0.01 to 10 μm, more preferably, it is in the range of 0.01 to 1 μm, most preferably it is in the range of 0.01 to 0.5 μm.

Re iii) Laser-sensitive systems comprising an oxygen-containing transition metal salt are described in WO 07/012,578. The oxygen-containing transition metal salt is preferably a molybdenum, chromium or tungsten oxide. More preferably, it is a molybdenum or tungsten oxide such as sodium molybdate, sodium tungstate, ammonium dimolybdate and ammonium octamolybdate. The laser-sensitive system comprising an oxygen-containing transition metal salt can also comprise an additive selected from the group consisting of organic acids, polyhydroxy compounds and bases. Examples of organic acids are tartaric acid and citric acid. Examples of polyhdroxy compounds are sucrose, gum arabic and meso-erythritol. Examples of bases are N,N-dimethylethanolamine and ammonia. Preferred embodiments are laser-sensitive systems comprising a) ammonium dimolybdate and an organic acid, b) sodium molybdate or sodium tungstate and a polyhydroxy compound or c) ammonium octamolybdate and a base.

Re iv) Examples of compounds containing a free carbonyl group are aldehydes, ketones and reducing carbohydrates. Examples of aldehydes are formaldehyde, acetaldehyde, propanal, butanal, pentanal, hexanal, benzaldehyde, salicylaldehyde and phenylacetaldehyde. Examples of ketones are acetone, butanone, 2-pentanone, 3-pentanone, 3-methyl-2-butanone, 1-phenyl-2-propanone, acetophenone, benzophenone and ascorbic acid (vitamin C). Reducing carbohydrates are capable of reducing Tollens' reagent. Examples of reducing carbohydrates are aldoses such as glucose and xylose, ketoses such as dehydroxyacetone and erythrulose, reducing disaccharides such as maltose and lactose and reducing polysaccharides. Preferred compounds containing a free carbonyl group are ascorbic acid, glucose, lactose and maltose. More preferably, it is glucose.

The nucleophile can be any nucleophile capable of reacting with the free carbonyl group of the compound containing the free carbonyl group. For example, the nucleophile can be an amine. Preferably, the nucleophile is an amino acid. Examples of aminoacids are 4-amino-hippuric acid and 4-aminobenzoic acid and the "standard" amino acids, which are glycine, alanine, valine, leucine, isoleucine, proline, phenylalanine, tyrosine, tryphthophane, cysteine, methionine, serine, threonine, lysine, arginine, histidine, aspartic acid, glutamic acid, asparagine and glutamine.

The molar ratio of the compound containing a free carbonyl group/nucleophile in the composition of the present invention can be in the range of 10/1 to 1/10, preferably 5/1 to 1/5, more preferably 2/1 to 1/2. Most preferably, the compound containing a free carbonyl group and the nucleophile are present in the composition in about equimolar amounts.

Any compound containing a free carbonyl group, which compound is substituted with one or more nucleophilic groups can be used, for example the compound containing a free carbonyl group, which compound is substituted with one or more nucleophilic groups, can be any of the compounds containing a free carbonyl group listed above, except that it is substituted with one or more nucleophilic groups. Preferred nucleophilic groups are amino groups. Examples of compounds containing a free carbonyl group, which compound is substituted with one or more amino groups, are amino sugars. Amino sugars are carbohydrates which contain an amino group in place of a hydroxyl group, which is not the glycosidic hydroxyl group. Examples of amino sugars are glucosamine and galactosamine.

Re v) Laser-sensitive systems comprising a compound having functional groups and a metal compound or an acid are described in WO 2006/068205. The compound having a functional group can be a polyhydroxy compound such as hydroxypropyl cellulose, methylhydroxy-cellulose or polyvinyl alcohol, or a compound carrying halogen or ester functionalities such as polyvinyl chloride or polyvinyl acetate. Examples of metal compounds are magnesium chloride, magnesium hydroxide, calcium oxide and zinc oxide. An example of an acid is p-toluenesulfonic acid.

Re vi) The colour former can be any suitable colour former such as a phthalide, a fluoran, a triarylmethane, a benzoxazine, a quinazoline, a spiropyran, a quinone, a thiazine or an oxazine or mixtures thereof.

Examples of phthalides are crystal violet lactone (3,3-bis (p-dimethylaminophenyl)-6-dimethyl-aminophtalide), 3,3-bis(p-dimethylaminophenyl)phthalide, 3,3-bis(1-ethyl-2-methylindol-3-yl)phthalide, 3,3-bis(1-octyl-2-methylindol-3-yl)phthalide, 3-(4-diethylaminophenyl)-3-(1-ethyl-2-methylindol-3-yl)-phthalide, 7-(N-ethyl-N-isopentylamino)-3-methyl-1-phenyl-spiro[4H-chromeno[2,3-c]pyrazole-4 (1H)-3'phthalide, 3,6,6'-tris(dimethylamino)spiro-[fluorene-9,3'-phthalide], 3,6,6'-tris(diethylamino)spiro[fluorene-9,3'-phthalide], 3,3-bis-[2-(p-dimethylaminophenyl)-2-(p-methoxyphenyl)ethenyl-4,5,6,7-tetrabromophthalide, 3,3-bis[2-(p-dimethylaminophenyl)-2-(p-methoxyphenyl) ethenyl-4,5,6,7-tetrachlorophthalide, 3,3-bis[1,1-bis(4-pyrrolidinophenyl)ethylene-2-yl]-4,5,6,7-tetrabromophthalide, 3,3-bis-[1-(4-methoxyphenyl)-1-(4-pyrridinophenyl)ethylene-2-yl]-4,5,6,7-tetrachlorophthalide, 3-(4-diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide and 3-(4-cyclo-hexylethylamino-2-methoxyphenyl)-3-(1-ethyl-2-methylindol-3-yl)-4-azaphthalide The phthalides can be prepared by methods known in the art, for example crystal violet lactone can be prepared as described in GB 1,347,467, and 3,3-bis(1-ethyl-2-methylindol-3-yl)phthalide can be prepared as described in GB 1,389,716.

Examples of fluorans are 3-di(ethyl)amino-6-methyl-7-(tert-butoxycarbonyl)anilinofluoran, 3-diethylamino-7-dibenzylaminofluoran, 3-dibutylamino-7-dibenzylaminofluoran, 3-diethyl-amino-6-methyl-7-(dibenzylamino) fluoran, 3-diethylamino-6-methylfluoran, 3-diethylamino-6-chloro-7-methylfluoran, 3-diethylamino-6-methyl-7-chlorofluoran, 3-diethylamino-7-tert-butylfluoran, 3-diethylamino-7-carboxyethylfluoran, 3-diethylamino-7-methylfluoran, 3-diethylamino-6,8-dimethylfluoran, 3-diethylamino-7-chlorofluoran, 3-dibutylamino-6-methylfluoran, 3-cyclohexylamino-6-chlorofluoran, 3-diethylamino-benzo[a]fluoran, 3-diethylamino-benzo[c]fluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-(3-trifluoromethylanilino)fluoran, 3-diethylamino-6-methyl-7-(2-chloroanilino)-fluoran, 3-diethylamino-6-methyl-7-(p-chloroanilino)fluoran, 3-diethylamino-6-methyl-7-(2-fluoroanilino)fluoran, 3-diethylamino-6-methyl-7-(p-octylanilino)fluoran, 3-diethylamino-7-(p-octylanilino)fluoran, 3-diethylamino-6-methyl-7-(p-methylanilino)fluoran, 3-diethylamino-6-ethoxyethyl-7-anilinofluoran, 3-diethylamino-6-methyl-7-(3-methylanilino)fluoran, 3-diethylamino-7-(3-trifluoromethylanilino)fluoran, 3-diethylamino-7-(2-chloroanilino)fluoran, 3-diethylamino-7-(2-fluoroanilino) fluoran, 3-diethylamino-6-chloro-7-anilinofluoran, 3-dibutylamino-6-methyl-7-anilinofluoran, 3-dibutylamino-6-methyl-7-(2,4-dimethylanilino)fluoran, 3-dibutylamino-6-methyl-7-(2-chloroanilino)fluoran, 3-dibutylamino-6-methyl-7-(4-chloroanilino)-fluoran, 3-dibutylamino-6-methyl-7-(2-fluoroanilino)fluoran, 3-dibutylamino-6-methyl-7-(3-tri-fluoromethylanilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino) fluoran, 3-dibutylamino-7-(2-fluoroanilino)fluoran, 3-dipentylamino-6-methyl-7-anilinofluoran, 3-dipentylamino-6-methyl-7-(4-2-chloroanilino)fluoran, 3-dipentylamino-7-(3-trifluoromethylanilino)fluoran, 3-dipentylamino-6-chloro-7-anilinofluoran, 3-dipentylamino-7-(4-chloroanilino)fluoran, 3-pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-hexylamino)-7-anilinofluoran, 3-(N-ethyl-p-toluidino)-amino-6-methyl-7-anilinofluoran, 3-(N-ethyl-p-toluidino)amino-7-methylfluoran, 3-(N-ethyl-N-isoamylamino)-6-methyl-7-anilinofluoran, 3-(N-ethyl-N-isoamylamino)-7-(2-chloroanilino)-fluoran, 3-(N-ethyl-N-isoamylamino)-6-chloro-7-anilinofluoran, 3-(N-ethyl-N-tetrahydrofurfuryl-amino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 2-methyl-6-p-(p-dimethylaminophenyl)aminoanilinofluoran, 2-methoxy-6-p-(p-dimethyl-aminophenyl)aminoanilinofluoran, 2-chloro-3-methyl-6-p-(p-phenylaminophenyl)aminoanilinofluoran, 2-diethylamino-6-p-(p-dimethylaminophenyl)aminoanilinofluoran, 2-phenyl-6-methyl-6-p-(p-phenylaminophenyl)aminoanilinofluoran, 2-benzyl-6-p-(p-phenylamino-phenyl)aminoanilinofluoran, 3-methyl-6-p-(p-dimethylaminophenyl)aminoanilinofluoran, 3-diethylamino-6-p-(p-diethylaminophenyl)aminoanilinofluoran, 3-diethylamino-6-p-(p-dibutyl-aminophenyl)aminoanilinofluoran and 2,4-dimethyl-6-[(4-dimethylamino)anilino]fluoran.

The fluorans can be prepared by methods known in the art, for example 3-diethylamino-7-dibenzylaminofluoran, 3-diethylamino-7-tert-butylfluoran, 3-diethylamino-6-methyl-7-anilinofluoran and 3-diethylamino-6-methyl-7-(2,4-dimethylanilino)fluoran and can be prepared as described in U.S. Pat. No. 5,166,350 A, 3-diethylamino-6-methyl-7-(3-methylanilino)fluoran can be prepared as described in EP 0 546 577 A1, 3-diethylamino-6-chloro-7-anilinofluoran can be prepared as described in DE 2130845, 3-pyrrolidino-6-methyl-7-anilinofluoran and 3-piperidino-6-methyl-7-anilinofluoran can be prepared as described in U.S. Pat. No. 3,959,571 A, 3-(N-ethyl-N-isoamylamino)-6-methyl-7-anilinofluoran can be prepared as described in GB 2 002 801 A, and 3-(N-methyl-N-propylamino)-6-methyl-7-anilinofluoran can be prepared as described in GB 2 154 597 A.

Examples of benzoxazines are 2-phenyl-4-(4-diethylaminophenyl)-4-(4-methoxyphenyl)-6-methyl-7-dimethylamino-3,1-benzoxazine, which can be prepared as described in EP 0 187 329 A1, and 2-phenyl-4-(4-diethylaminophenyl)-4-(4-methoxyphenyl)-8-methyl-7-dimethylamino-3,1-benzoxazine.

An example of a quinazoline is 4,4'-[1-methylethylidene) bis(4,1-phenyleneoxy-4,2-quina-zolinediyl)]bis[N,N-diethylbenzeneamine]. An example of a triarylmethane is bis(N-methyldi-phenylamine)-4-yl-(N-butylcarbazole)-3-yl-methane, which can be prepared as described in GB 1,548, 059.

Examples of spiropyrans are 1',3',3'-trimethylspiro[2H-1-benzopyran-2,2'-indoline], 1,3,3-trimethylspiro[indoline-2, 3'-[3H-]naphth[2,1-b][1,4]oxazine] and 1',3',3'-trimethylspiro-[2H-1-benzothiopyran-2,2'-indoline].

An example of a quinone is hematoxyline. An example of an oxazine is 3,7-bis(dimethylamino)-10-benzoylphenoxazine. An example of a thiazine is 3,7-bis(dimethylamino)-10-benzoylphenothiazine.

Preferably, the colour former is a phthalide or a fluoran or mixtures thereof.

Any suitable colour developer or latent colour developer can be used.

A latent colour developer generates a colour developer, preferably an acid, upon activation, for example upon heat treatment.

An example of a latent colour developer is a metal salt of a carboxylic acid of formula (I)

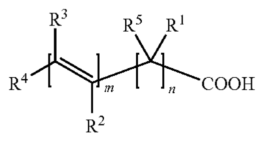

or a mixture of metal salts of carboxylic acids of formula (I) in which n is 0, 1, 2, 3, 4, 5, 6, 7, 8, 9, 10, 11, 12, 13 or 14, m is 0, 1, 2, 3 or 4, $R^1$ and $R^5$ are the same or different and can be hydrogen, hydroxy, $C_{1-12}$-alkyl, carboxy, $C_{1-4}$-alkoxycarbonyl, carbamoyl, $C_{1-4}$-alkylaminocarbonyl, acyl, amino, ($C_{1-4}$-alkyl)-CO—NH or ureido, $R^2$ and $R^3$ are the same or different and can be hydrogen, $C_{1-4}$-alkyl or ($C_{1-4}$-alkyl)-CO—NH, $R^4$ is hydrogen, $C_{1-12}$-alkyl, carboxy, $C_{1-4}$-alkoxycarbonyl, carbamoyl, $C_{1-4}$-alkylaminocarbonyl, acyl, amino, ($C_{1-4}$-alkyl)-CO—NH, ureido, phenyl, 2-, 3-, or 4-pyridyl, or 1-, 2- or 3-naphthyl, whereby phenyl, pyridyl or naphthyl can be unsubstituted or mono-, di- or trisubstituted with $C_{1-4}$-alkyl, phenyl, $C_{1-4}$-alkoxy, hydroxy, di($C_{1-4}$-alkyl)amino or halogen.

Latent colour developers, which are metal salts of a carboxylic acid of formula (I) are described in WO 2006/067073.

Examples of carboxylic acids are phenylacetic acid, p-tolylacetic acid, 4-biphenylacetic acid, mandelic acid, trans-styrylacetic acid, sorbic acid, α-acetamidocinnamic acid, 4-methyl-cinnamic acid, 4-methoxyphenylacetic acid, undecylenic acid, succinic acid, ferulic acid, muconic acid and lactic acid or mixtures thereof.

The metal can be an alkaline earth metal, a transition metal or a metal from the main groups III and IV. Preferably, it is selected from the group consisting of magnesium, calcium, strontium, titanium, vanadium, chromium, molybdenum, manganese, iron, cobalt, nickel, copper, zinc, aluminium and tin. More preferably, it is selected from the group consisting of calcium, manganese, cobalt, nickel, copper, zinc, aluminium and tin. Most preferably, the metal is zinc.

The metal salt of the carboxylic acid can be formed by reacting an inorganic metal salt such as metal halide or sulfate with an alkali metal salt of the carboxylic acid in water.

The latent colour developer could also be an amine salt of an organic metal compound is of formula

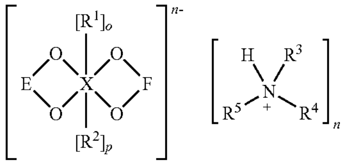

(II)

in which X is silicon or boron, and

E and F are the same or different and are selected from the group consisting of

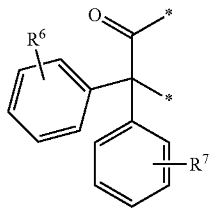

a

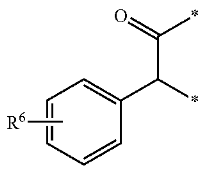

b

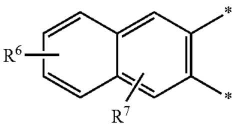

c

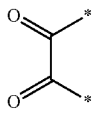

d

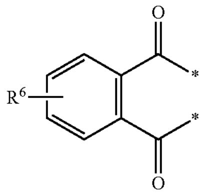

e

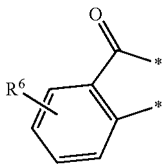

f

-continued

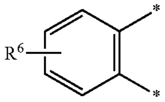

g

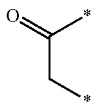

h in which $R^6$ and $R^7$ are the same or different and are hydrogen, $C_{1-4}$-alkyl, $C_{1-4}$-alkoxy, halogen, amino or carboxy, and for X=silicon o=1 and p=0, and $R^1$ is aryl, aralkyl or $C_{1-4}$-alkyl, or o=1 and p=1, and $R^1$ and $R^2$ together form a one residue selected from the group consisting of a, b, c, d, e, f, g and h, and for X=boron o=0 and p=0, and $R^3$, $R^4$ and $R^5$ are the same or different and are hydrogen, $C_{1-12}$-alkyl, $C_{1-6}$-hydroxyalkyl, allyl, aralkyl or arylsulfonyl, in which aralkyl or arylsulfonyl can be substituted with $C_{1-4}$-alkyl, or $R^3$ and $R^4$ together with the nitrogen to which they are attached form a morpholino or piperidino ring.

Examples of latent colour developers of formula (II) are given in WO 2006/108745.

The latent colour developer of formula II can be prepared by reacting a silane such as phenyl triethoxysilane, a silicate such as tetraethylorthosilicate, or boric acid with the respective compound of the formula OH-E-OH and/or OH—F—OH in the presence of the respective amine of the formula NR3R4R5.

The latent colour developer could also be a derivative of a sulfuric acid, phosphoric acid or carboxylic acid. Latent colour developers of this kind are described in WO 2007/088104.

Examples of sulfuric acids are sulfuric acid, fluorosulfuric acid, chlorosulfuric acid, nitrosylsulfuric acid and organic sulphuric acids such as 4-styrene sulfonic acid, p-toluenesulfonic acid, benzene sulfonic acid, xylene sulfonic acid, phenol sulfonic acid, methane sulfonic acid, trifluormethane sulfonic acid, poly(4-styrene sulfonic acid) and copolymers comprising 4-styrene sulfonic acid units such as poly(4-styrenesulfonic acid-co-maleic acid). Examples of phosphoric acids are phosphoric acid, fluorophosphoric acid and hexafluorophosphoric acid. Examples of carboxylic acids are dichloroacetic acid, trichloroacetic acid, oxalic acid and maleic acid.

Preferred acid derivatives are ester, amide and thioester derivatives of sulfuric acids, phosphoric acids or carboxylic acids.

Ester, amide and thioester derivatives of sulfuric acids, phosphoric acids or carboxylic acids can be sulfuric acids, phosphoric acids or carboxylic acids having at least one OH-group substituted with $OR^1$, $NR^2R^3$ or $SR^4$, wherein $R^1$, $R^2$, $R^3$ and $R^4$ can be $C_{1-30}$-alkyl, $C_{2-30}$-alkenyl, $C_{4-8}$-cycloalkyl, $C_{7-12}$-bicycloalkyl, $C_{5-8}$-cycloalkenyl, aralkyl, aralkenyl or aryl, which can be unsubstituted or substituted with $C_{1-6}$-alkyl, $C_{1-6}$-alkoxy, halogen, hydroxyl, $C(O)OC_{1-6}$-alkyl or $OC(O)C_{1-6}$-alkyl.

Ester, amide and thioester derivatives of sulfuric acids, phosphoric acids or carboxylic acids can also be two acids, selected from the group consisting of sulfuric acids, phosphoric acids and carboxylic acids, being linked by an O-A-O, $NR^5$-E-$R^6$N or S-J-S group, wherein $R^5$ and $R^6$ can be as defined for $R^1$, $R^2$, $R^3$ and $R^4$, and A, E and J can be $C_{2-14}$- alkylene, $C_{2-14}$-alkenylene, $C_{4-8}$-cycloalkylene, $C_{4-8}$-cycloalkenylene or arylene, which can be unsubstituted or substituted with $C_{1-6}$-alkyl, $C_{1-6}$-alkoxy, halogen, hydroxyl, $C(O)OC_{1-6}$-alkyl or $OC(O)C_{1-6}$-alkyl.

Especially preferred are ester derivatives of organic sulfuric acids, for example cyclohexyl-p-toluenesulfonate, 2-methylcyclohexyl-p-toluenesulfonate, menthyl-p-toluenesulfonate, 1,4-cyclohexanediol di-p-toluenesulfonate, 4-tosylcyclohexanecarboxylic acid ethyl ester and 2,2-dimethylpropyl-p-toluenesulfonate.

The acid derivatives are either commercially available or can be prepared by known processes, e.g. by the reaction of a suitable alcohol with a suitable sulfonyl chloride in the presence of a catalyst.

More preferably, the laser-sensitive system is selected from the group consisting of i) a salt of an acid and an amine or mixtures of salts of acids and amines, ii) titanium dioxide, iii) an oxygen containing transition metal salt, iv) a compound containing a free carbonyl group and a nucleophile or a compound containing a free carbonyl group, which compound is substituted with one or more nucleophilic groups, v) a compound having functional groups and a metal compound or an acid, and vi) a colour former and a latent colour developer.

Preferably, the laser-sensitive system is not a colour former and a colour developer, wherein colour developer refers to a non-latent colour developer.

More preferably, the laser-sensitive system is i) a salt of an acid and an amine or mixtures of salts of acids and amines or ii) titanium dioxide.

The polymeric particles of the present invention can also comprise additional components.

The additional component can be IR absorbers, UV absorbers, pigments, smoke suppressants and taggants. Taggants are various substances added to a product to indicate its source of manufacture.

IR absorbers can be organic or inorganic. Examples of organic IR absorbers are alkylated triphenyl phosphorothionates, for example as sold under the trade name Ciba® Irgalube® 211 or Carbon Black, for example as sold under the trade names Ciba® Microsol® Black 2B or Ciba® Microsol® Black C-E2.

Examples of inorganic IR absorbers are oxides, hydroxides, sulfides, sulfates and phosphates of metals such as copper, bismuth, iron, nickel, tin, zinc, manganese, zirconium and antimony, including antimony(V) oxide doped mica and tin(IV) oxide doped mica, An example of a UV absorber is 2-hydroxy-4-methoxybenzophenone.

Pigments can be added as inorganic IR absorbers, for enhanced contrast between unimaged and imaged areas or as a security feature.

Examples of pigments which function as inorganic IR absorbers are kaolin, calcined kaolin, mica, aluminum oxide, aluminum hydroxide, aluminum silicates, talc, amorphous silica and colloidal silicon dioxide.

Examples of pigments which can be added for enhanced contrast between umimaged and imaged area are titan dioxide, calcium carbonate, barium sulfate, polystyrene resin, urea-formaldehyde resin, hollow plastic pigment.

Examples of pigments which can be added as a security feature are fluorescent pigments or magnetic pigments.

An example of a smoke suppressant is ammonium octamolybdate.

The polymeric particles can comprise from 10 to 90 by weight of the laser-sensitive system, from 10 to 90% by weight of the polymeric matrix and from 0 to 10% by weight of additional components based on the dry weight of the polymeric particles.

Preferably, the polymeric particles comprise from 20 to 80 by weight of the laser-sensitive system, from 20 to 80% by weight of the polymeric matrix and from 0 to 10% by weight of additional components based on the dry weight of the polymeric particles.

More preferably, the polymeric particles comprise from 30 to 70 by weight of the laser-sensitive system, from 30 to 70% by weight of the polymeric matrix and from 0 to 10% by weight of additional components based on the dry weight of the polymeric particles.

Most preferably, the polymeric particles comprise from 40 to 60 by weight of the laser-sensitive system, from 40 to 60% by weight of the polymeric matrix and from 0 to 10% by weight of additional components based on the dry weight of the polymeric particles.

Also part of the present invention is a process for the preparation of the polymeric particles of the present invention which process comprises the steps of i) mixing the laser-sensitive system with a water-soluble monomer mixture, prepolymer or polymer, optionally in the presence of one or more water-insoluble polymers, and ii) forming a water-insoluble polymer from the water-soluble monomer mixture, prepolymer or polymer and thus effecting encapsulation of the laser-sensitive system in a polymeric matrix.

A polymer is water-soluble if 5 g or more than 5 g of polymer dissolve in 100 g neutral (pH=7) water.

A polymer is water-insoluble if less than 5 g of polymer dissolve in 100 g neutral (pH=7) water.

In a first embodiment of the process for the preparation of the polymeric particles, the laser-sensitive system is mixed with a water-soluble monomer mixture, optionally in the presence of one or more water-insoluble polymers, and the water-insoluble polymer is formed from the water-soluble monomer mixture by polymerization of the monomer mixture in the presence of an initiator.

Preferably, the monomer mixture comprises ethylenically unsaturated monomers such as acrylic monomers, styrene monomers, vinyl monomer, olefin monomers or $\alpha,\beta$-unsaturated carboxylic acid monomers. More preferably, the monomer mixture comprises at least one acrylic monomer. A particularly preferred ethylenically unsaturated monomer is acrylamide.

Polymerisation of the monomer mixture can be achieved by addition of a suitable initiator. The initiator can be, for example, a peroxide, a persulfate, an azo compound, a redox couple or mixtures thereof. Examples of peroxides are hydrogen peroxide, tert-butyl peroxide, cumene hydroperoxide and benzoyl peroxide. Examples of persulfates are ammonium, sodium or potassium persulfate. Examples of azo compounds are 2,2-azobisisobutyronitrile and 4,4'-azobis(4-cyanovaleric acid). Examples of redox couples are tert-butylhydrogenperoxide/sodium sulfite, sodium persulfate/sodium hydrogensulfite or sodium chlorate/sodium hydrogensulfite.

The monomer mixture preferably comprises a crosslinking agent carrying two ethylenically unsaturated groups, for example N,N'-methylenebisacrylamide. The monomer mixture can comprise from 0.001 to 20%, preferably from 0.1 to 10%, by weight of a crosslinking agent based on the weight of the monomer mixture.

The one or more water-insoluble polymers, which could optionally be present, could be any-water-soluble polymer.

In a second embodiment of the process for the preparation of the polymeric particles, the laser-sensitive system is mixed with a water-soluble prepolymer, optionally in the presence of one or more water-insoluble polymers, and the water-insoluble polymer is formed from the water-soluble prepolymer by crosslinking the prepolymer.

The prepolymer can be any prepolymer capable of forming a water-insoluble polymer, for example a water-soluble aldehyde polymer such as a water-soluble melamine-formaldehyde polymer or a water-soluble urea-formaldehyde polymer. Crosslinking and the formation of water-insoluble melamine-formaldehyde or urea-formaldehyde polymers can be affected by heat and/or acid treatment.

The prepolymer can be prepared by polymerisation of suitable monomers using polymerisation techniques known in the art.

The one or more water-insoluble polymers, which could optionally be present, could be any-water-soluble polymer, preferably it is an acrylic polymer, for example a sodium acrylate/acrylamide copolymer.

In a third embodiment of the process for the preparation of the polymeric particles, the laser-sensitive system is mixed with a water-soluble polymer carrying acidic or basic functional groups in their salt forms, optionally in the presence of one or more water-insoluble polymers, and the water-insoluble polymer is formed from the water-soluble polymer by altering the pH.

An example of an acidic functional group in its salt form is the $—COO^-NH_4^+$ group. An example of a basic functional group in its salt form is the $—NH_4^+HCOO^-$ group. An example of a water-soluble polymer carrying acidic functional groups is styrene/acrylic acid ammonium salt copolymer, for example 65/35 (w/w) styrene/acrylic acid, ammonium salt copolymer.

The pH could be altered by addition of acid or base, or alternatively by removal of acid or base, for example when the acidic or basic functional group in their salt forms carry volatile (for example having a boiling point at atmospheric pressure of below 130° C.) counterions, for example $NH_4^+$ or $HCOO^-$, the respective base ($NH_3$) or acid (HCOOH) could be removed by distillation.

The water-soluble polymer carrying acidic or basic functional groups in their salt forms can be prepared by polymerisation of suitable monomers using polymerisation techniques known in the art.

The one or more water-insoluble polymers, which could optionally be present, could be any-water-soluble polymer, preferably it is an acrylic polymer, more preferably, it is a styrene/methyl methacrylate copolymer, for example a 70/30 (w/w) styrene/methyl methacrylate copolymer.

In a fourth embodiment of the process for the preparation of the polymeric particles, the laser-sensitive system is mixed with a water-soluble polymer carrying functional groups capable of crosslinking with a crosslinking agent, optionally in the presence of one or more water-insoluble polymers, and the water-insoluble polymer is formed from the water-soluble polymer carrying the functional groups by addition of a crosslinking agent.

Examples of functional groups are carboxy (—COOH), hydroxyl (—OH), amino ($—NH_2$) and chloro (—Cl). Examples of polymers carrying functional groups are polyacrylic acid, styrene/acrylic acid copolymer, polyvinyl chloride (PVC) and polyvinylalcohol.

Examples of crosslinking agents capable of reacting with functional groups are silane derivatives such as vinylsilane, carbodiimide derivatives such as N,N'-dicyclohexyl-carbodiimide (DCC) and 1-ethyl-3-(3-dimethylaminopropyl) carbodiimide hydrochloride (EDC), aziridine derivatives, epoxide derivatives or multivalent metal salts such as zinc oxide or ammonium zirconium carbonate.

Preferred functional groups are carboxy (—COOH) groups or salts thereof, such as 65/35 (w/w) styrene-acrylic acid, ammonium salt copolymer. Preferred crosslinkers capable of reacting with carboxy groups are multivalent metal salts such as zinc oxide or ammonium zirconium carbonate.

The water-soluble polymer carrying functional groups can be prepared by polymerisation of suitable monomers using polymerisation techniques known in the art.

The one or more water-insoluble polymers, which could optionally be present, could be any-water-soluble polymer, preferably it is an acrylic polymer, more preferably, it is a styrene/methyl methacrylate copolymer, for example a 70/30 (w/w) styrene/methyl methacrylate copolymer.

The laser-sensitive system is preferably mixed with the water-soluble monomer mixture, prepolymer or polymer, optionally in the presence of one or more water-insoluble polymers and/or one or more additional components, in the presence of an aqueous phase, an oil phase and optionally an amphiphatic stabilizer.

The aqueous phase is usually water. The oil phase can be any oil phase, capable of forming a two phase system with water, for example mineral oil, dearomatized hydrocarbon mixture, for example as sold under the tradename Exxon® D40, vegetable oil and aromatic hydrocarbons such as toluene.

The weight ratio of aqueous phase/oil phase is usually from 10/1 to 1/10, preferably from 5/1 to 1/5, more preferably from 1/1 to 1/4.

Usually the aqueous phase and the oil phase are mixed under high shear to form a water-in-oil emulsion comprising the aqueous phase in the form of droplets having an average size from 1 to 20 μm dispersed in the oil phase.

Examples of additional components are given above.

Any suitable amphiphatic stabilizer can be used, for example 90/10 (w/w) stearyl methacrylate/methacrylic acid copolymer having a molecular weight of 40,000 g/mol.

After formation of the water-insoluble polymer from the water-soluble monomer mixture, prepolymer or polymer, the polymeric particles can be removed by filtration. Preferably, the aqueous phase and optionally also part of the oil phase is removed before the filtration.

Also part of the present invention is a composition comprising the polymeric particles of the present invention and a polymeric binder.

It is preferred that the polymeric binder is different from the one or more water-insoluble polymers of the polymeric matrix.

The polymeric binder can be selected from the group consisting of acrylic polymers, styrene polymers, hydrogenated products of styrene polymers, vinyl polymers, vinyl polymer derivatives, polyolefins, hydrogenated polyolefins, epoxidized polyolefins, aldehyde polymers, aldehyde polymer derivatives, ketone polymers, epoxide polymers, polyamides, polyesters, polyurethanes, polyisocyanates, sulfone-based polymers, silicium-based polymers, natural polymers and natural polymer derivatives.

Definitions of the listed polymers are given above.

Preferably the polymeric binder is an acrylic polymer, a styrene polymer such as "hydrocarbon resin", polystyrene and styrene/maleic acid copolymer, a vinyl polymer such as polyvinyl acetate and polyvinyl alcohol, an aldehyde polymer such as phenol resin and polyvinyl butyral, an aldehyde polymer derivative such as alkylated urea formaldehyde resin and alkylated melamine formaldehyde resin, a ketone resin, an epoxide polymer, a polyamide, a polyimide, a polyester such as an “alkyd resin”, a polyurethane, a poly-isocyanate, a silicum-based polymer such as silicone resin, a natural polymer such as rosin, terpene resin, shellac, copal Manila, asphalts, starch and gum Arabic, a natural polymer derivative such as dextrin, nitrocellulose, ethylcellulose, acetyl cellulose, acetyl propionyl cellulose, acetyl butyryl cellulose, propionyl cellulose, butyryl cellulose and carboxymethyl cellulose.

More preferably, the polymeric binder is an acrylic, a styrene polymer, a vinyl polymer or a mixture thereof.

Most preferably, the polymeric binder is a core shell polymer comprising a styrene-acrylic acid copolymer and a styrene/ethylhexyl acrylate copolymer, a styrene/butadiene copolymer or a vinyl acetate/crotonic acid copolymer.

The composition of the present invention can also comprise a solvent. The solvent can be water, an organic solvent or mixtures thereof.

Examples of organic solvents are $C_{1-4}$-alkyl acetates, $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethyl-acetamide, N-methylpyrolidone and sulfolane, whereby $C_{1-4}$-alkanols and $C_{2-4}$-polyols may be substituted with $C_{1-4}$-alkoxy. Examples of $C_{1-4}$-alkyl acetates are methyl acetate, ethyl acetate and propyl acetate. Examples of $C_{1-4}$-alkanols are methanol, ethanol, propanol, isopropanol or butanol, isobutanol, sec-butanol and tert-butanol. Examples of a $C_{1-4}$-alkoxy-derivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile.

More preferably, the solvent is water or a $C_{1-4}$-alkyl acetate, for example propyl acetate.

The composition of the present invention can also comprise additional components.

The additional components that may be included in the composition can be any component suitable for improving the performance of the composition. The additional component can be IR absorbers, UV absorbers, pigments, stabilizers, antioxidants, rheology modifiers, wetting agents, biocides, smoke suppressants and taggants.

Definitions of IR absorbers, UV absorbers, pigments, smoke suppressants and taggants are given above.

Examples of rheology modifiers are xanthan gum, methylcellulose, hydroxypropyl methylcellulose, or acrylic polymers such as sold under the tradenames Ciba® Rheovis® 112, Ciba® Rheovis® 132 and Ciba® Rheovis® 152.

An example of a wetting agent is Ciba® Irgaclear® D, a sorbitol based clarifying agent.

Examples of biocides are Acticide® MBS, which includes a mixture of chloromethyl isothiazolinone and methyl isothiazolinone, Biocheck® 410, which includes a combination of 2-dibromo-2,4-dicyanobutane and 1,2-benzisothiazolin-3-one, Biochek®721M, which includes a mixture of 1,2-dibromo-2,4-dicyanobutane and 2-bromo-2-nitro-1,3-propandiol and Metasol®TK 100, which includes 2-(4-thiazolyl)-benzimidazole.

The composition can comprise from 1 to 90% by weight of the polymeric particles, from 1 to 90% by dry weight of the polymeric binder, from 1 to 90% by weight of the solvent and from 0 to 10% by weight of additional components based on the weight of the composition.

Preferably, the composition comprises from 20 to 90% by weight of the polymeric particles, from 1 to 60% by dry weight of the polymeric binder, from 10 to 70% by weight of the solvent and from 0 to 10% by weight of additional components based on the weight of the composition.

More preferably, the composition comprises from 30 to 80% by weight of the polymeric particles, from 1 to 40% by dry weight of the polymeric binder, from 15 to 60% by weight of the solvent and from 0 to 10% by weight of additional components based on the weight of the composition.

Most preferably, the composition comprises from 35 to 70 by weight of the polymeric particles, from 5 to 20% by dry weight of the polymeric binder, from 25 to 50% by weight of the solvent and from 0 to 10% by weight of additional components based on the weight of the composition.

Also part of the invention is a process for preparing the composition of the present invention which process comprises the step of mixing the polymeric particles of the present invention and a polymeric binder, optionally in the presence of solvent and additional components.

Another aspect of the present invention is a process for forming a laser-sensitive coating layer on a substrate, which process comprises the step of applying the composition of the present invention to the substrate.

The substrate can be a sheet or any other three dimensional object, it can be transparent or opaque and it can have an even or uneven surface. An example of a substrate having an uneven surface is a filled paper bag, such as a paper bag of cement. The substrate can be made from paper, cardboard, metal, wood, textiles, glass, ceramics and/or polymers. The substrate can also be a pharmaceutical tablet or foodstuff. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer.

The composition of the present invention can be applied to the substrate using a standard coating application as such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or in the wet-end section of the paper machine.

The composition applied to the substrate can be dried, for example at ambient or elevated temperature to form the laser-sensitive coating layer.

The laser-sensitive coating layer has usually a thickness in the range of 0.1 to 1000 μm. Preferably, the thickness is in the range of 1 to 500 μm. More preferably, it is in the range of 1 to 200 μm. Most preferably, it is in the range of 1-20 μm.

The formed coating layer can be top-coated with a laminate layer or overprint varnish, which reduces emission during the marking process. If the material of the laminate layer or the overprint varnish is selected so that it does not absorb at the wavelength of the imaging laser then the laser-sensitive coating layer can be imaged through the laminate layer without damaging or marking the laminate. Also the laminate or overprint varnish is ideally chosen that it does not result in colouration of the laser-sensitive coating layer before the energy treatment.

Also part of the invention is a coated substrate obtainable by above process.

Also part of the invention is a process for preparing a marked substrate, which comprises the steps of i) providing a substrate coated with the composition of the present invention, and ii) exposing those parts of the coated substrate, where a marking is intended, to energy in order to generate a marking.

The energy can be heat or any other energy, which yields a marking when applied to the substrate coated with the composition of the present invention. Examples of such energy are UV, IR, visible or microwave irradiation.

The energy can be applied to the coated substrate in any suitable way, for example heat can be applied by using a thermal printer, and UV, visible and IR irradiation can be applied by using a UV, visible or IR laser. Examples of IR lasers are $CO_2$ lasers, Nd:YAG lasers and IR semicoductor lasers.

Preferably, the energy is IR irradiation. More preferably, the energy is IR irradiation having a wavelength in the range of 780 to 1,000,000 nm. Even more preferably, the energy is IR irradiation generated by a $CO_2$ laser or a Nd:YAG laser.

Typically the exact power of the IR laser and the line speed is determined by the application and chosen to be sufficient to generate the image, for example, when the wavelength of the IR laser is 10,600 nm and the diameter of the laser beam is 0.35 mm, the power is typically 0.5 to 4 W, and the line speed is typically 300 to 1,000 mm/s.

Yet another aspect of the invention is a marked substrate, which is obtained by above process.

The laser-sensitive composition of the present invention has the advantage that the polymeric matrix of the polymeric particles and the polymeric binder can be selected and optimized independently from each other to yield a composition which shows optimum coating properties as well as optimum laser-marking performance. In addition, the composition can be prepared by an easy and convenient process, which only involves the mixing of the polymeric particles with the polymeric binder.

EXAMPLES

Example 1

Preparation of Polymeric Particles Comprising a Laser Sensitive System (Ammonium Dihydrogen Orthophosphate, Ammonium Sulphate and Sucrose) Encapsulated in a Polymeric Matrix Comprising a Styrene/Acrylic Acid Copolymer and a Styrene/Methyl Methacrylate Copolymer An aqueous phase is prepared by dissolving 9 g of ammonium dihydrogen orthophosphate, 9 g of ammonium sulphate and 22.5 g of sucrose into 69.5 g of water followed by addition of 60 g of a 46% by weight polymer microemulsion containing 32% by weight 70/30 (w/w) styrene/methyl methacrylate copolymer having a molecular weight of 200,000 g/mol stabilized with a 14% by weight 65/35 (w/w) styrene/acrylic acid, ammonium salt copolymer having a molecular weight of 6,000 g/mol. An oil phase is prepared by mixing 17 g of a 20% by weight solution in Exxsol® D40, a dearomatised hydrocarbon solvent having a boiling point range from 154° C. to 187° C. available from ExxonMobil, of a 90/10 (w/w) stearyl methacrylate/methacrylic acid copolymer having a molecular weight of 40,000 g/mol, which functions as amphiphatic stabilizer, and 300 g Isopar G, which is isoparaffin with a distillation range of 155 to 179° C. available from ExxonMobil. The above aqueous phase is added to the oil phase under a high shear homogeniser to form a water-in-oil emulsion having a mean aqueous droplet particle sizes of 5 μm. The emulsion formed is transferred to a 1-liter flask set up for distillation. The emulsion is subjected to vacuum distillation to remove water/Isopar G mixture. The vacuum distillation is continued to 90° C. until no further water is collected in the distillate. Next, the flask contents are cooled to 25° C. and the polymeric particles are isolated by filtration and oven dried at 30° C. The obtained polymeric particles are off-white, free-flowing and have a mean particle size diameter of 5 μm.

Example 2

Preparation of Polymeric Particles Comprising a Laser Sensitive System (Ammonium Dihydrogen Orthophosphate, Ammonium Sulphate and Sucrose) Encapsulated in a Polymeric Matrix Comprising a Crosslinked Polyacrylamide A monomer solution is prepared by dissolving 1 g of methylene bisacrylamide into 53.7 g of 49.5% by weight aqueous acrylamide solution followed by addition of an aqueous solution consisting of 9 g of ammonium dihydrogen orthophosphate, 9 g of ammonium sulphate, 22.5 g of sucrose and 71.5 g of water. The resulting mixture is adjusted to pH 5.0 by addition of 0.5 mL of 99% by weight acetic acid. An oil phase is prepared consisting of 17 g of a 20% by weight aqueous solution of a 90/10 (w/w) stearyl methacrylate/methacrylic acid copolymer having a molecular weight of 40,000 g/mol, which functions as amphiphatic stabilizer, and 300 g Isopar G, which is isoparaffin with a distillation range of 155 to 179° C. available from ExxonMobil. To the above monomer solution is added 1.65 mL of 1% by weight sodium sulphite solution and the resulting aqueous mixture is then added to the above oil phase under a high shear homogeniser to form a water-in-oil emulsion having a mean aqueous droplet particle sizes of 3 μm. The emulsion formed is transferred to a 1-liter flask and then deoxygenated by bubbling nitrogen throughout the emulsion. Next, 0.5 mL of 7% by weight tert-butyl hydroperoxide in Isopar G is added to initiate the polymerisation of the acrylic monomers. The flask contents give an exothermic reaction from 28° C. to 37° C. After polymerisation, the flask is configured for vacuum distillation. The polymerised emulsion is subjected to vacuum distillation to remove water/Isopar G mixture. The vacuum distillation is continued to 100° C. until no further water is collected in the distillate. Next, the flask contents are cooled to 25° C. and the polymeric particles are isolated by filtration and oven drying at 50° C. The obtained polymeric particles off-white, free-flowing and have a mean particle size diameter of 3 μm.

Example 3

Preparation of Polymeric Particles Comprising a Laser Sensitive System (Ammonium Dihydrogen Orthophosphate, Ammonium Sulphate and Sucrose) Encapsulated in a Polymeric Matrix Comprising a Sodium Acrylate/Acrylamide Copolymer and a Melamine-Formaldehyde Polymer An aqueous phase is prepared consisting of 9 g of ammonium dihydrogen orthophosphate, 9 g of ammonium sulphate, 22.5 g of sucrose, 14.4 g of Ciba® Alcapsol® P-604, which is a 18% by weight aqueous solution of a sodium acrylate/acrylamide copolymer available from Ciba Specialty Chemicals, 35.7 g of Beetle® PT-3336, which is a 70% by weight solution of a melamine formaldehyde polymer resin available from BIP Limited, and 68.1 g of water. This mixture is adjusted to pH 4.0 by addition of 1.5 mL of 95% by weight formic acid. An oil phase is prepared consisting of 17 g of a 20% by weight solution in Exxsol® D40, a dearomatised hydrocarbon solvent having a boiling point range from 154° C. to 187° C. available from ExxonMobil, of a 90/10 (w/w) stearyl methacrylate/methacrylic acid copolymer having a molecular weight of 40,000 g/mol, which functions as amphiphatic stabilizer, and 300 g Isopar G, which is isoparaffin with a distillation range of 155° C. to 179° C. available from ExxonMobil. The above aqueous phase is added to the oil phase under a high shear homogeniser to form a water-in-oil emulsion having a mean aqueous droplet particle size of 18 μm. The emulsion formed is transferred to a 1-liter flask and then the contents warmed to 60° C. to cure the melamine formaldehyde resin. Next, the flask is configured for vacuum distillation and the contents subjected to distillation to remove water/Isopar G mixture. The vacuum distillation is continued to 100° C. until no further water is collected in the distillate. Finally, the flask contents are cooled to 25° C. and the polymeric particles isolated by filtration and oven drying at 50° C. The obtained polymeric particles are pale yellow, free flowing and have a mean particle size diameter of 18 μm.

Example 4

Preparation of an Acrylic Binder

To a 1 liter resin pot fitted with mechanical stirrer, condenser, nitrogen inlet, temperature probe and feed inlets are placed 98.9 g water and 483.9 g Joncryl® 8078, a solution of an ammonium salt of a low molecular weight styrene/acrylic acid copolymer. The contents are heated to 85° C. and degassed with nitrogen for 30 minutes. A monomer phase is prepared by mixing 192.5 g styrene with 157.5 g 2-ethylhexyl acrylate. An initiator feed is prepared by dissolving 1.97 g ammonium persulfate in 63.7 g water. When the reactor is at temperature and degassed, 0.66 g ammonium persulfate is added to the reactor. After 2 minutes the monomer and initiator feeds are started appropriate to a 3 and 4 hour feed respectively. The reactor contents are maintained at 85° C. throughout the feeds. After completion of the feeds, the reactor contents are held for a further 1 hour at 85° C. before being cooled down to below 40° C. at which point 0.9 g Acticide LG, a biocide containing chlorinated and non-chlorinated methyl isothiazolones, is added. This resulted in an emulsion polymer of 49.2% solids, pH 8.3 and a Brookfield RVT viscosity of 1100 cPs.

Application of the Laser-Sensitive Polymeric Particles of Examples 1, 2, and 3 on Paper and Polymer Film The laser-sensitive polymeric particles of example 1, 2, respectively, 3 (9.0 g) are added slowly to a mixture of Ciba® Latexia® 319, a styrene butadiene latex (solids content 50%, particle size 0.12 μm, glass transition temperature (Tg) 28° C.), (6.7 g) and water (5.5 g). The mixture is stirred for 10 minutes.

The laser-sensitive polymeric particles of example 1, 2, respectively, 3 (9.0 g) are also added slowly to a mixture of the acrylic binder of example 4 (6.7 g) and water (5.5 g). The mixture is stirred for 10 minutes.

The obtained coating compositions are then applied by a 12 μm coating bar onto Xerox paper and polypropylene and dried to yield a transparent coating. The coatings are then imaged using a $CO_2$ IR laser (wavelength: 10,600 nm, power: 0.5 to 4 W, diameter of laser beam: 0.35 mm, line speed 300 to 1000 mm/s) to yield a high contrast dark markings. The images are also easily readable using a barcode reader.

Application of the Laser-Sensitive Polymeric Particles of Example 1 on Polypropylene Labels The laser-sensitive polymeric particles from example 1 are added at 50% by weight concentration to a pressure sensitive adhesive, which is styrene butadiene, respectively, styrene acrylic acid copolymer. The so-treated adhesive is then coated with a 12 μm coating bar onto polypropylene film to form a laser sensitive label. After application to secondary packaging board, the labels are imaged using a $CO_2$ IR laser (wavelength: 10,600 nm, power: 0.5 to 4 W, diameter of laser beam: 0.35 mm, line speed 300 to 1000 mm/s) to yield a high contrast dark marking.

Example 5

Preparation of Polymeric Particles Comprising a Laser Sensitive System (Titanium Dioxide in Anatase Form) Encapsulated in a Polymeric Matrix Comprising a Crosslinked Styrene/Acrylic Acid Copolymer and a Styrene/Methyl Methacrylate Copolymer An aqueous phase is prepared by diluting 100 g of a 46% by weight polymer microemulsion containing 32% by weight 70/30 (w/w) styrene-methyl methacrylate copolymer having a molecular weight of 200,000 g/mol stabilized with a 14% by weight 65/35 (w/w) styrene-acrylic acid, ammonium salt copolymer having a molecular weight of 6,000 g/mol, with 100 g of water followed by dispersing 50 g of Tioxide® A-HR, a titanium dioxide in the anatase form having a crystal size of 0.15 μm sold by Huntsman, and 5 g of zinc oxide, which functions as crosslinker, under a high speed mixer. Separately, an oil phase is prepared by mixing 30 g of a 20% by weight solution of 90/10 (w/w) stearyl methacrylate-methacrylic acid copolymer having a molecular weight of 40,000 g/mol, which functions as amphiphatic stabilizer, and 500 g Isopar G, an isoparaffin with a distillation range of 155 to 179° C. available from Exxon Mobil. The above aqueous phase is added to the oil phase under a high shear homogeniser to form a water-in-oil emulsion having a mean aqueous droplet particle sizes of 10 to 20 μm. The emulsion formed is transferred to a 1-liter flask set up for distillation. The emulsion is subjected to vacuum distillation to remove water/Isopar G mixture. The vacuum distillation is continued to 100° C. until no further water is collected in the distillate. Next, the flask contents are cooled to 25° C. and the polymeric particles comprising encapsulated titanium dioxide in the anatase form are isolated by filtration and oven dried at 90° C. The obtained polymeric particles are white, flowing white-coloured and have a mean particle size diameter of 14 μm.

Application of the Laser-Sensitive Polymeric Particles of Example 5 on Tobacco Board A varnish is prepared by mixing together Vinnapas® C501 resin manufactured by Wacker Chemie AG, a solid copolymer of vinyl acetate and crotonic acid with an acid number of 7.5 mg KOH/g, a molecular weight of 170 000 g/mol and a Tg of ca. 43° C., (20 parts) and propyl acetate (80 parts). The polymeric particles of example 5 (90 parts) are then added to the pre-prepared varnish (55 parts) over 5 minutes to prepare a white gravure ink. The ink is applied to standard tobacco packaging board using a standard K2 bar and then dried. Imaging with an Nd:YAG laser at 1064 nm gives clearly readable markings.

The invention claimed is:

1. A particle comprising:

(i) a polymeric matrix comprising one or more water-insoluble polymers; and (ii) a laser-sensitive system comprising an ammonium salt, wherein the laser-sensitive system is encapsulated in the polymeric matrix, and wherein at least one of the one or more water-insoluble polymers of the polymeric matrix is cross-linked.

2. The particle of claim 1, wherein the ammonium salt is at least one of ammonium dimolybdate and ammonium octamolybdate.

3. A process for the preparation of the particle of claim 1, the process comprising:

mixing the laser-sensitive system with a water-soluble monomer mixture, prepolymer or polymer, optionally in the presence of one or more water-insoluble polymers; and forming a cross-linked water-insoluble polymer from the water-soluble monomer mixture, prepolymer or polymer and thus effecting encapsulation of the laser-sensitive system in a polymeric matrix.

4. The process of claim 3, wherein the laser-sensitive system is mixed with a water-soluble prepolymer, optionally in the presence of one or more water-insoluble polymers, and the water-insoluble polymer is formed from the water-soluble prepolymer by crosslinking the prepolymer.

5. The process of claim 3, wherein the laser-sensitive system is mixed with a water-soluble polymer carrying acidic or basic functional groups in their salt forms, optionally in the presence of one or more water-insoluble polymers, and the water-insoluble polymer is formed from the water-soluble polymer by altering the pH.

6. The process of claim 3, wherein the laser-sensitive system is mixed with a water-soluble polymer carrying functional groups capable of crosslinking with a crosslinking agent, optionally in the presence of one or more water-insoluble polymers, and the water-insoluble polymer is formed from the water-soluble polymer carrying the functional groups by addition of the crosslinking agent.

7. A composition comprising:

at least one particle comprising (i) a polymeric matrix comprising one or more water-insoluble polymers, and (ii) a laser-sensitive system comprising an ammonium salt and a polymeric binder, wherein the laser-sensitive system is encapsulated in the polymeric matrix, and wherein at least one of the one or more water-insoluble polymers of the polymeric matrix is cross-linked.

8. A substrate coated with the composition of claim 7.

9. A process for preparing a marked substrate, the process comprising:

providing a substrate coated with a composition comprising at least one particle comprising (i) a polymeric matrix comprising one or more water-insoluble polymers, and (ii) a laser-sensitive system comprising an ammonium salt and a polymeric binder, wherein the laser-sensitive system is encapsulated in the polymeric matrix, and wherein at least one of the one or more water-insoluble polymers of the polymeric matrix is cross-linked; and exposing those parts of the coated substrate, where a marking is intended, to energy in order to generate a marking.

10. A marked substrate obtained by the process of claim 9.

* * * * *